(12) United States Patent
Eom et al.

(10) Patent No.: US 8,325,384 B2
(45) Date of Patent: *Dec. 4, 2012

(54) METHOD AND APPARATUS FOR CONTROLLING COLOR REGISTRATION SENSORS

(75) Inventors: Yoon-seop Eom, Suwon-si (KR); Chang-kyung Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,291

(22) Filed: Mar. 16, 2011

(65) Prior Publication Data

US 2011/0170143 A1    Jul. 14, 2011

Related U.S. Application Data

(63) Continuation of application No. 11/439,434, filed on May 24, 2006, now Pat. No. 7,933,040.

(30) Foreign Application Priority Data

May 24, 2005  (KR) .................. 10-2005-0043761

(51) Int. Cl.
*G06F 15/00* (2006.01)
*G03F 3/08* (2006.01)

(52) U.S. Cl. ........................................ 358/1.7; 358/518

(58) Field of Classification Search .............. 358/1.7, 358/1.9, 3.32, 1.12, 504, 509, 514, 518; 382/162, 382/167; 347/40, 47, 81; 399/39, 40, 41, 399/52, 62, 64

See application file for complete search history.

(56) References Cited

U.S. PATENT DOCUMENTS

| | | | |
|---|---|---|---|
| 7,215,896 B2 | 5/2007 | Yamada et al. | |
| 7,274,888 B2 * | 9/2007 | Tomizawa | 399/49 |
| 7,373,093 B2 | 5/2008 | Shinohara et al. | |
| 7,933,040 B2 * | 4/2011 | Eom et al. | 358/1.7 |
| 2002/0113968 A1 | 8/2002 | Parisi et al. | |
| 2003/0202810 A1 | 10/2003 | Udaka et al. | |
| 2004/0202485 A1 | 10/2004 | Uyama | |
| 2004/0227966 A1 | 11/2004 | Lee | |
| 2004/0263870 A1 | 12/2004 | Itoh et al. | |
| 2005/0158074 A1 | 7/2005 | Murakami et al. | |
| 2005/0238372 A1 | 10/2005 | Shinohara et al. | |

FOREIGN PATENT DOCUMENTS

| | | |
|---|---|---|
| JP | 2000-305340 | 11/2000 |
| JP | 2001-290330 | 10/2001 |
| KR | 1020030042579 A | 6/2003 |
| KR | 100393079 B1 | 7/2003 |
| KR | 1020030094697 A | 12/2003 |

* cited by examiner

*Primary Examiner* — Gabriel Garcia
(74) *Attorney, Agent, or Firm* — Roylance, Abrams, Berdo & Goodman, LLP

(57) ABSTRACT

A method and apparatus for controlling registration sensors are provided, in which a transfer unit transfers an electrostatic latent image onto a printing medium, at least one registration sensor senses image alignment errors by irradiating light to the transfer unit to sense reflected light, a sensor data storage unit stores characteristics data of the respective registration sensors, and a sensor control unit controls the registration sensors based on the characteristics data of the respective registration sensors, wherein the registration sensors are placed into the transfer unit. Accordingly, time for performing an algorithm of color registration can be reduced, and registration can be achieved correctly in a short time, irrespective of a set frame of the image forming apparatus.

7 Claims, 6 Drawing Sheets

FIG. 3

| | | 07 | 06 | 05 | 04 | 03 | 02 | 01 | 00 |
|---|---|---|---|---|---|---|---|---|---|
| 0 | Supplier (ID) | 0x00 | S | A | M | S | U | N | G | P |
| 1 | Model Name | 0x08 | C | 0 | L | 0 | R | 2 | 0 | 0 |
| 2 | MFG Date | 0x10 | 2 | 0 | 0 | 4 | 1 | 2 | 1 | 0 |
| 3 | Serial Number | 0x18 | S | N | 0 | 0 | 0 | 0 | 0 | 1 |
| 4 | Printing pages count | 0x20 | 0 | 0 | 0 | 0 | 0 | 0 | 0 | 1 |
| 5 | Toner capacity | 0x28 | 0 | 0 | 0 | 0 | 0 | 0 | 0 | 0 |
| 6 | Printing dot count | 0x30 | 0 | 0 | 0 | 0 | 9 | 0 | 0 | 0 |
| 7 | Color regi 1 LUT data | 0x38 | 1 | 3 | 5 | 7 | 0 | 0 | 0 | 0 |
| 8 | Color regi 2 LUT data | 0x40 | 2 | 4 | 6 | 8 | 0 | 0 | 0 | |

METHOD AND APPARATUS FOR CONTROLLING COLOR REGISTRATION SENSORS

CROSS-REFERENCE TO RELATED PATENT APPLICATION

This is a continuation application of U.S. patent application Ser. No. 11/439,434, filed May 24, 2006 issued as U.S. Pat. No. 7,933,040 on Apr. 26, 2011, which claims the benefit under 35 U.S.C. §119(a) of Korean Patent Application No. 10-2005-0043761 filed on May 24, 2005, in the Korean Intellectual Property Office, the entire disclosure of which is hereby incorporated by reference.

BACKGROUND OF THE INVENTION

1. Field of the Invention

The present invention relates to an image forming apparatus. More particularly, the present invention relates to an apparatus for controlling color registration sensors by incorporating the registration sensors into a transfer unit and using characteristics of the registration sensors stored in a memory and a method thereof.

2. Description of the Related Art

Generally, an electro-photographic image forming apparatus, such as a color laser printer, includes four photosensitive drums, an exposing unit, developing units, and a transfer belt. The photosensitive drums correspond to four separate colors: yellow, cyan, magenta, and black. The exposing unit forms an electrostatic latent image that a user wants to print by irradiating light. The developing units develop the electrostatic latent image by using developers for the respective colors. The transfer belt sequentially and reiteratively receives an image which is developed onto the respective photosensitive drums to form a complete color image, which is then transferred to a sheet of paper.

In order to obtain an accurate color image, starting and ending points where the transfer of the electrostatic latent image, or a toner image, on a transfer belt start and end must be aligned in accordance with the respective colors. Therefore, it is important that exposure starting points in accordance with the respective photosensitive drums of the exposing unit are accurately controlled by taking a transfer speed of the transfer belt into consideration. Here, the accurate setting of the exposure starting points is referred to as registration. In order to achieve the registration, the registration sensors irradiate light onto a test pattern of the transfer belt and sense the amount of reflected light.

A conventional registration sensor is placed into a set frame of an image forming apparatus instead of the transfer belt. However, due to mechanical design constraints, however, the registration sensor is placed at the top of a fuse unit, which may lead to heat generation and a breakdown or error of the registration sensor. In addition, a problem exists when the registration sensor is placed into the set frame of the image forming apparatus. Therefore, left-right precision of the registration sensor must be maintained. In addition, because of a structural height variation and characteristic differences stemming from the sensitivity of light emitting and receiving units of the registration sensors, output characteristics of the registration sensors need to be gradually corrected, which can be a time-consuming process.

Accordingly, there is a need for an improved method and apparatus for controlling color registration sensors based on characteristics of the registration sensors.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus for controlling registration sensors based on characteristics data of the registration sensors by incorporating the registration sensors into a transfer unit and by using characteristics of the registration sensors stored in a memory and a method thereof.

According to an aspect of exemplary embodiments of the present invention, there is provided an apparatus for controlling registration sensors, in which a transfer unit transfers an electrostatic latent image onto a printing medium; one or more registration sensors senses image alignment errors by irradiating light to the transfer unit to sense reflected light; a sensor data storage unit stores characteristics data of the respective registration sensors; and a sensor control unit controls the registration sensors based on the characteristics data of the respective registration sensors, wherein the registration sensors are placed into the transfer unit.

In an exemplary implementation, the sensor data storage unit may be placed into the transfer unit.

In another exemplary implementation, the registration sensors may include a light emitting unit that irradiates light to the transfer unit; and a light receiving unit that receives reflected light from the transfer unit to output voltage signals corresponding to an amount of the reflected light.

In still another exemplary implementation, the sensor data storage unit may store data corresponding to the amount of light irradiated from the light emitting unit and voltage output of the light receiving unit in accordance with the amount of irradiated light.

In yet another exemplary implementation, the sensor control unit may control the amount of light irradiated from the light emitting unit based on the data stored in the sensor data storage unit.

In a further exemplary implementation, the sensor control unit may control the amount of light irradiated from the light emitting unit by modulating a pulse width of current applied to the light emitting unit.

In an exemplary implementation, the sensor control unit may control the registration sensors by extracting the characteristics data of the respective registration sensors from the sensor data storage unit of a replaced transfer unit, if replacement of the transfer unit is sensed.

In another exemplary implementation, the sensor control unit may control the registration sensors by extracting the characteristics data of the respective registration sensors from the sensor data storage unit, if opening or closing of the image forming apparatus cover is sensed.

In still another exemplary implementation, the sensor control unit may control the registration sensors by extracting the characteristics data of the respective registration sensors from the sensor data storage unit, if an applied power of a power source of the image forming apparatus is sensed.

In yet another exemplary implementation, the sensor control unit may store the changed operational characteristics data of the registration sensors to the sensor data storage unit, if any changes in operational characteristics of the registration sensors are sensed.

In a further exemplary implementation, a backup storage unit may be included to back up and store the characteristics data of the registration sensors stored in the sensor data storage unit.

In an exemplary implementation, the sensor control unit may control the registration sensors by extracting the characteristics data of the registration sensors from the backup storage unit, if the characteristics data of the registration sensors can not be extracted from the sensor data storage unit.

In another exemplary implementation, a data recovery unit may be included to recover the characteristics data of the registration sensors stored in the sensor data storage unit by extracting the characteristics data of the registration sensors from the backup storage unit, if the characteristics data of the registration sensors stored in the sensor data storage unit is damaged.

In still another exemplary implementation, the transfer unit may be detachable from the image forming apparatus.

According to another aspect of exemplary embodiments of the present invention, there is provided a method of controlling registration sensors based on the characteristics data of the registration sensors which is stored in a storage medium.

In an exemplary implementation, the characteristics data of the registration sensors may correspond to the amount of light irradiated from the light emitting unit and voltage output of the light receiving unit in accordance with the amount of irradiated light.

In another exemplary implementation, the amount of light irradiated from the light emitting unit may be controlled based on the stored characteristics data.

In still another exemplary implementation, the amount of light irradiated from the light emitting unit may be controlled by modulating a pulse width of current applied to the light emitting unit.

In yet another exemplary implementation, the registration sensors may be controlled by extracting the characteristics data of the respective registration sensors from the storage medium which is placed into a replaced transfer unit, if replacement of the transfer unit is sensed.

In a further exemplary implementation, the registration sensors may be controlled by extracting the characteristics data of the respective registration sensors from the storage medium, if opening or closing of the image forming apparatus cover is sensed.

In an exemplary implementation, the registration sensors may be controlled by extracting the characteristics data of the respective registration sensors from the storage medium, if an applied power of a power source of the image forming apparatus is sensed.

In an exemplary implementation, the changed operational characteristics data of the registration sensors may be stored in the storage medium, if any changes in operational characteristics of the registration sensors are sensed.

In an exemplary implementation, the characteristics data of the registration sensors, which is stored in the storage medium, is backed up and stored.

In an exemplary implementation, the registration sensors may be controlled by extracting the characteristics data of the registration sensors, which are backed up during the storing of the characteristics data, if the characteristics data of the registration sensors can not be extracted from the storage medium.

In an exemplary implementation, the characteristics data of the registration sensors stored in storage medium is recovered by extracting the characteristics data of the registration sensors, which are backed up during the storing of the characteristics data, if the characteristics data of the registration sensors stored in the storage medium is damaged.

The exemplary embodiments of the present invention also provides computer-readable medium having embodied thereon a computer program for executing the method of controlling registration sensors.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which:

FIG. 3 is a table describing data related to the transfer unit 100 stored in the sensor data storage unit 140 for controlling color registration sensors according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted.

Figure 1:
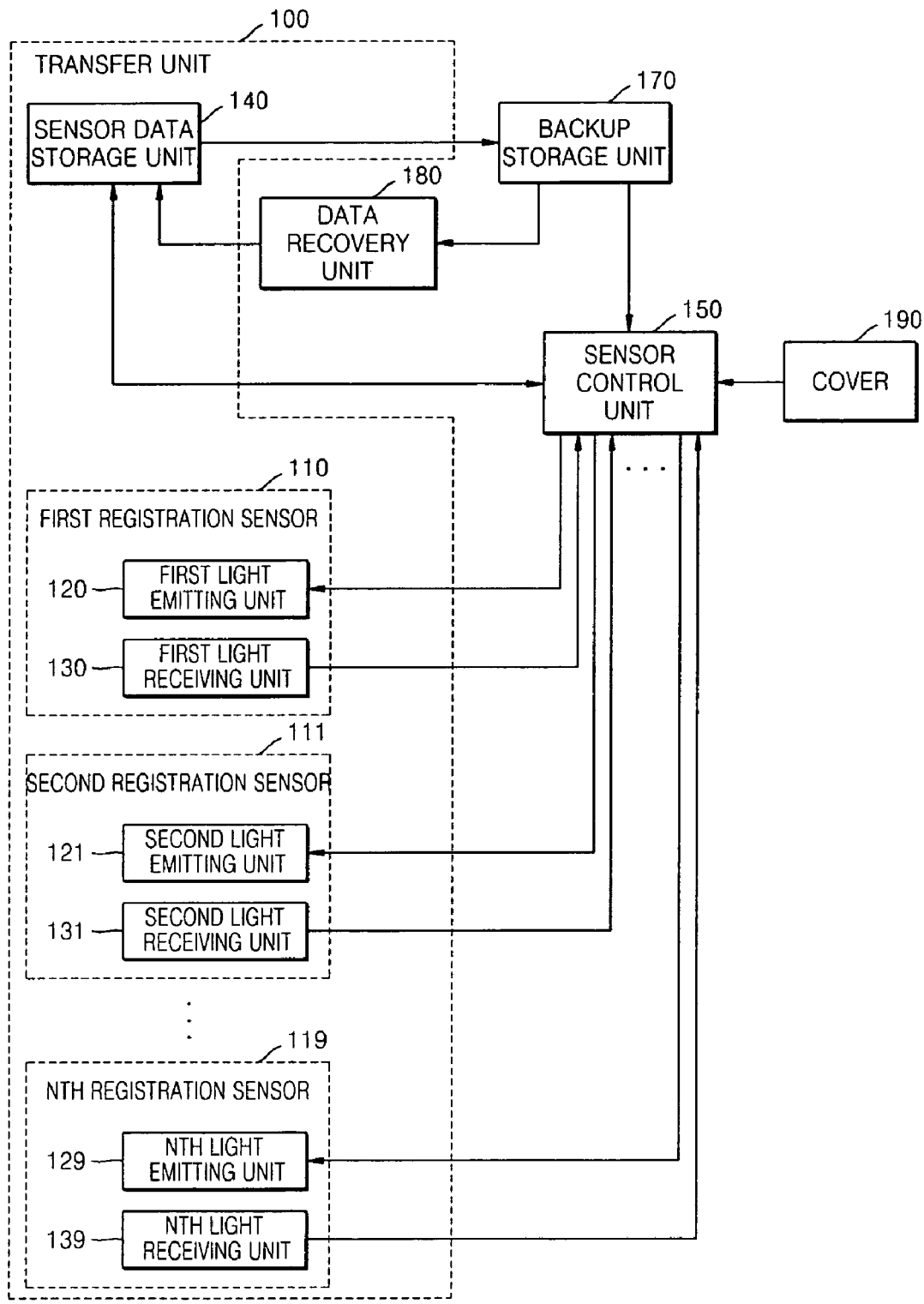
FIG. 1 is a functional block diagram of a structure of an apparatus for controlling color registration sensors according to an exemplary embodiment of the present invention.

FIG. 1 is a functional block diagram of a structure of an apparatus for controlling color registration sensors according to an exemplary embodiment of the present invention. The image alignment registration apparatus according to an exemplary embodiment of the present invention includes a transfer unit 100, sensor control unit 150, backup storage unit 170, data recovery unit 180, and cover 190. The transfer unit 100 includes a sensor data storage unit 140 and first to nth registration sensors 110, . . . , 119. The first to nth registration sensors 110, . . . , 119 include first to nth light emitting units 120, . . . , 129 and first to nth light receiving units 130, . . . , 139.

Referring to FIG. 1, the operation of the apparatus for controlling color registration according to an exemplary embodiment of the present invention will be described. The transfer unit 100 transfers an electrostatic latent image onto a printing paper. The transfer unit 100 includes a transfer belt, transfer roller, belt support roller, and customer replacement memory unit (CRUM) in which data related to the transfer unit 100 is stored. In an exemplary implementation, the transfer unit 100 includes consumable parts and is detachable from the image forming apparatus.

The transfer unit 100 includes the first to nth registration sensors 110, ..., 119 and the sensor data storage unit 140.

The first to nth registration sensors 110, ..., 119 irradiate light to the transfer belt of the transfer unit 100 and sense the reflected light to measure an image alignment error.

The first to nth registration sensors 110, ..., 119 include the first to nth light emitting units 120, ..., 129 and the first to nth light receiving units 130, ..., 139.

The first to nth light emitting units 120, ..., 129 irradiate light to the transfer belt of the transfer unit 100.

The first to nth light receiving units 130, ..., 139 receive the light reflected from the transfer belt of the transfer unit 100 and output a voltage signal in accordance with the amount of the reflected light.

The sensor data storage unit 140 stores data related to the transfer unit 100, such as characteristics of the first to nth registration sensors 110, ..., 119. In accordance with the first to nth registration sensors 110, ..., 119, the sensor data storage unit 140 stores data corresponding to output voltage signals of the first to nth light receiving units 130, ..., 139, based on the amount of irradiated light and the data related to the amount of light irradiated by the first to nth light emitting units 120, ..., 129.

The sensor control unit 150 controls the first to nth registration sensors 110, ..., 119 based on the characteristics data of the first to nth registration sensors 110, ..., 119, which is stored in the sensor data storage unit 140.

For example, the sensor control unit 150 controls the light irradiated by the first to nth light emitting units 120, ..., 129, based on the data stored in the sensor data storage unit 140. Also, the sensor control unit 150 controls the amount of light to be irradiated by the first to nth light emitting units 120, ..., 129 based on a pulse width modulation (PWM) method, by which the pulse width of the current applied to the first to nth light emitting units 120, ..., 129 is modulated.

Figure 2:
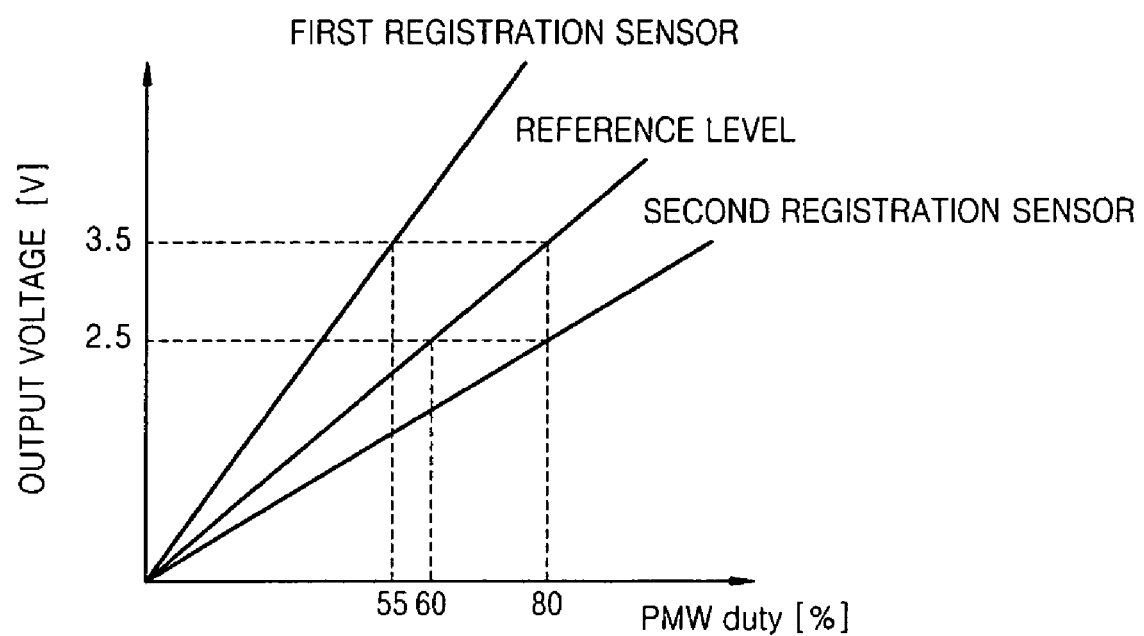
FIG. 2 is a graph illustrating characteristics of registration sensors according to an exemplary embodiment of the present invention.

FIG. 2 is a graph illustrating characteristics of registration sensors according to an exemplary embodiment of the present invention. For example, if the output voltage from the first light receiving unit 130 of the first registration sensor 110 is 3.5 V, the sensor control unit 150 corrects the pulse width duty, or PWM duty, of the current applied to the first light emitting units 120 from 80% to 55% to control the amount of light irradiated by the first light emitting units 120. Also, if the output voltage from the second light receiving unit 131 of the second registration sensor 111 is 2.5 V, the sensor control unit 150 corrects the PWM duty of the current applied to the second light emitting units 121 from 60% to 80% in order to control the amount of light irradiated by the second light emitting units 121.

Moreover, if any changes in characteristics of the first to nth registration sensors 110, ..., 119, due to a breakdown or error of the first to nth registration sensors 110, ..., 119, are detected by the sensor control unit 150, the changed characteristics is stored in the sensor data storage unit 140.

In addition, if replacement of the transfer unit 100 is detected by the sensor control unit 150, the characteristics data of the first to nth registration sensors 110, ..., 119 is extracted from the sensor data storage unit 140 to control the first to nth registration sensors 110, ..., 119 of the replaced transfer unit 100. Also, if an applied power of a power source of the image forming apparatus is detected by the sensor control unit 150, the characteristics data of the first to nth registration sensors 110, ..., 119 is extracted from the sensor data storage unit 140 to control the first to nth registration sensors 110, ..., 119.

The backup storage unit 170 backups and stores the characteristics data of the first to nth registration sensors 110, ..., 119 stored in the sensor data storage unit 140. If the characteristics of the first to nth registration sensors 110, ..., 119 is not extractable from the sensor data storage unit 140, the characteristics data of the first to nth registration sensors 110, ..., 119 is extracted from the sensor control unit 150 to control the first to nth registration sensors 110, ..., 119.

The data recovery unit 180 extracts the characteristics of the first to nth registration sensors 110, ..., 119 from the backup storage unit 170 and restores the damaged characteristics data of the first to nth registration sensors 110, ..., 119, if the characteristics data of the first to nth registration sensors 110, ..., 119 stored in the sensor data storage unit 140 is damaged.

The cover 190 is provided to one side of the image forming apparatus so that a user can access the interior of the image forming apparatus by opening and closing the image cover 190. If the opening or closing of the cover 190 is detected by the sensor control unit 150, the characteristics data of the first to nth registration sensors 110, ..., 119 is extracted from sensor data storage unit 140 to control the first to nth registration sensors 110, ..., 119.

FIG. 3 is a table describing data related to the transfer unit 100 stored in the sensor data storage unit 140 of the apparatus for controlling color registration according to an exemplary embodiment of the present invention. The table of FIG. 3 will be described with reference to FIG. 1 and FIGS. 4A and B.

The table provides information of a supplier (0, supplier), a model name (1, model name), manufacturing date (2, MFG date), serial number (3, serial number), printing pages count (4, printing pages count), toner capacity (5, toner capacity), printing dot count (6, printing dot count), characteristics look-up table of the first registration sensor (7, color regi 1 LUT data), and characteristics look-up table of the second registration sensor (8, color regi 1 LUT data).

The characteristics look-up tables of the first and second registration sensors 110 and 111 relate to the voltage output data of the first and second light receiving units 130 with respect to the amount of light irradiated from the first and second registration sensors 110 and 111 to the first and second light emitting units 120 and 121.

Figure 4A:
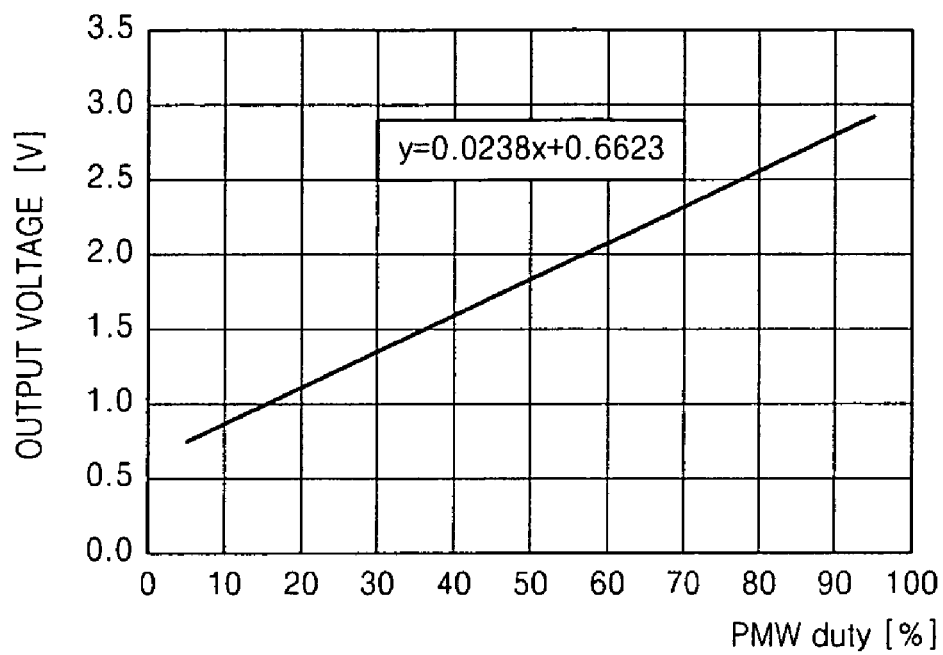
FIG. 4A is a graph illustrating the characteristics data of the first registration sensor 110.

FIG. 4A is a graph illustrating an example of the characteristics data of the first registration sensor 110.

In an exemplary implementation, the X axis is a pulse width duty of the current applied to the first light emitting unit 120 of the first registration sensor 110, and the Y axis is an output voltage of the first light receiving unit 120 of the first registration sensor 110 with respect to the pulse width duty of the current applied from the first light emitting unit 120. The relationship between the pulse width duty of the current applied to the first light emitting unit 120 of the first registration sensor 110 and the output voltage of the light receiving unit 120 can be expressed as: $y=0.0238x+0.6623$.

Figure 4B:
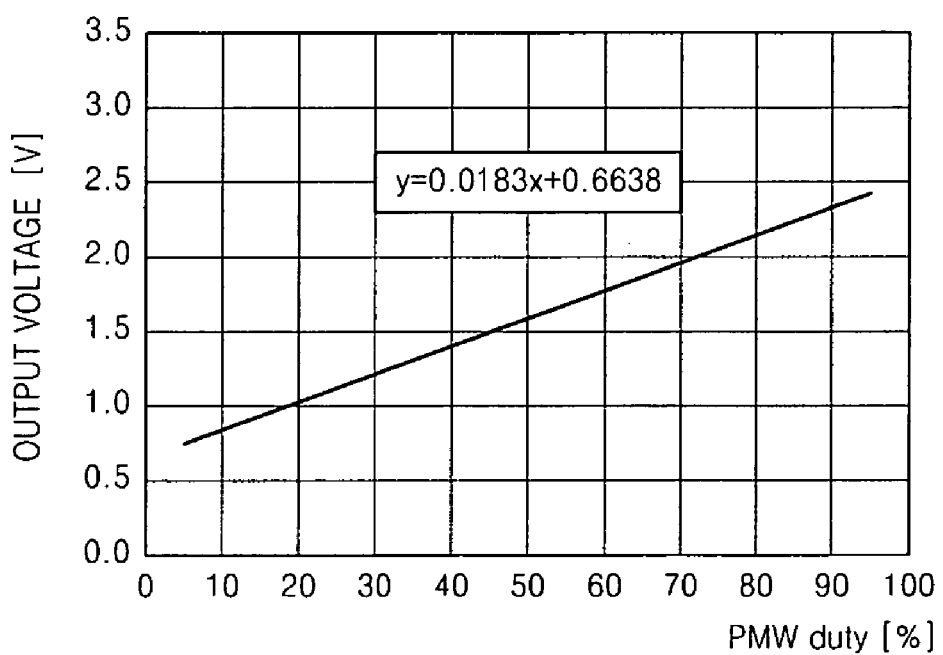
FIG. 4B is a graph illustrating the characteristics data of the second registration sensor 111.

FIG. 4B is a graph illustrating an example of the characteristics data of the second registration sensor 111.

In an exemplary implementation, the X axis is a pulse width duty of the current applied to the second light emitting unit 121 of the second registration sensor 111, and the Y axis is an output voltage of the second light receiving unit 121 of the second registration sensor 111 with respect to the pulse width duty of the current applied from the second light emitting unit 121. The relationship between pulse width duty of the current applied to the second light emitting unit 121 of the second registration sensor 111 and the output voltage of the light receiving unit 121 can be expressed as: $y=0.0183x+0.6638$.

Figure 5:
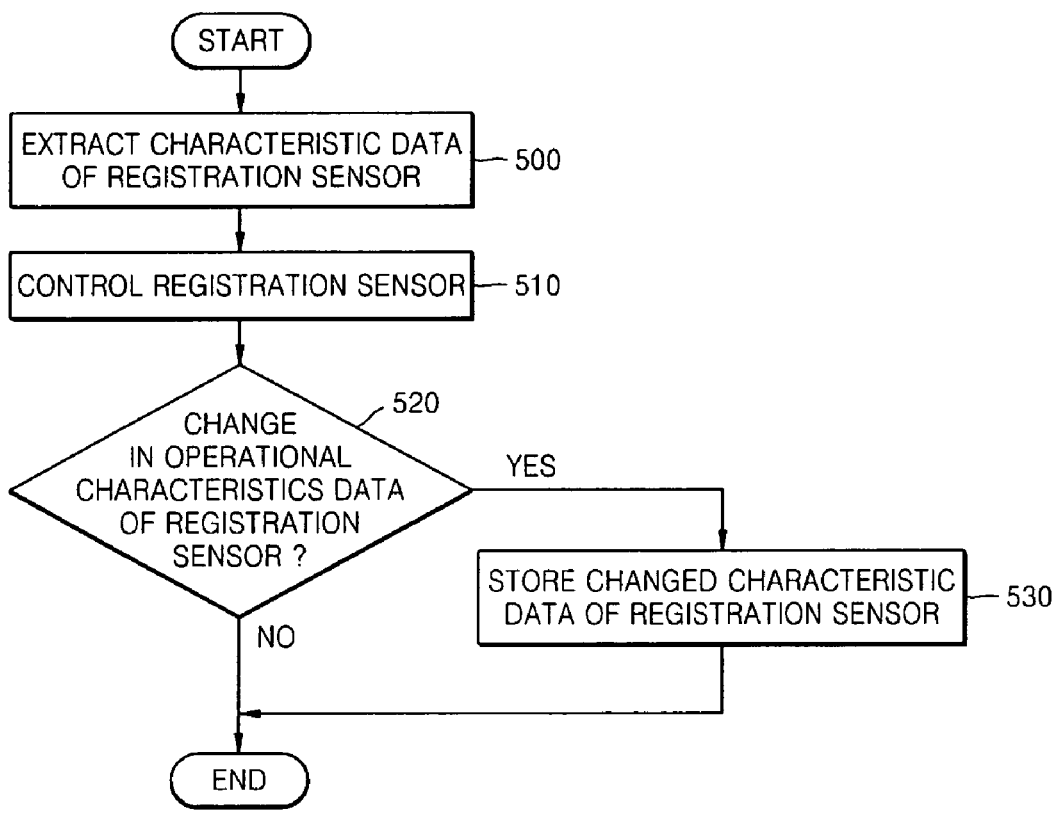
FIG. 5 is a flowchart of a method of controlling color registration sensors according to an exemplary embodiment of the present invention.

FIG. 5 is a flowchart of a method of controlling color registration according to an exemplary embodiment of the present invention.

The method of controlling color registration according to an exemplary embodiment of the present invention relates to an image forming apparatus including a transfer unit which is placed with one or more registration sensors and a CRUM, in which characteristics data of registration sensors are stored. The registration sensors include a light emitting unit which irradiates light onto the transfer belt and a light receiving unit which receives the light reflected from the transfer belt.

First, characteristics data of the registration sensors are extracted from a storage medium (operation 500). The characteristics data relates to the amount of light irradiated from the light emitting unit and output voltage of the light receiving unit with respect to the amount of irradiated light.

Operation 500 is performed where the transfer unit is replaced, opening or closing of the image forming apparatus cover is detected, and the applied power of a power source of the image forming apparatus is detected. If replacement of the transfer unit is detected, the characteristics of the respective registration sensors are extracted from the storage medium of the replaced transfer unit to control the registration sensors. If the opening or closing of the cover or the applied power of a power source of the image forming apparatus is detected, the characteristics data of the respective registration sensors is extracted from the sensor data storage unit 140 to control the respective registration sensors.

Based on the characteristics data of the registration sensors, which is extracted from operation 500, the registration sensors are controlled (operation 510). In operation 510, based on the characteristics data of the registration sensors extracted from operation 500, the amount of light irradiated from the light emitting unit is controlled by modulating a pulse width of the current applied to the light emitting unit.

Next, changes in operational characteristics of the registration sensors due to a breakdown or error of the registration sensors are detected (operation 520).

Finally, if any changes in operational characteristics of the registration sensors are detected in operation 520, the changed operational characteristics of the registration sensors are stored in the storage medium (operation 530).

Figure 6:
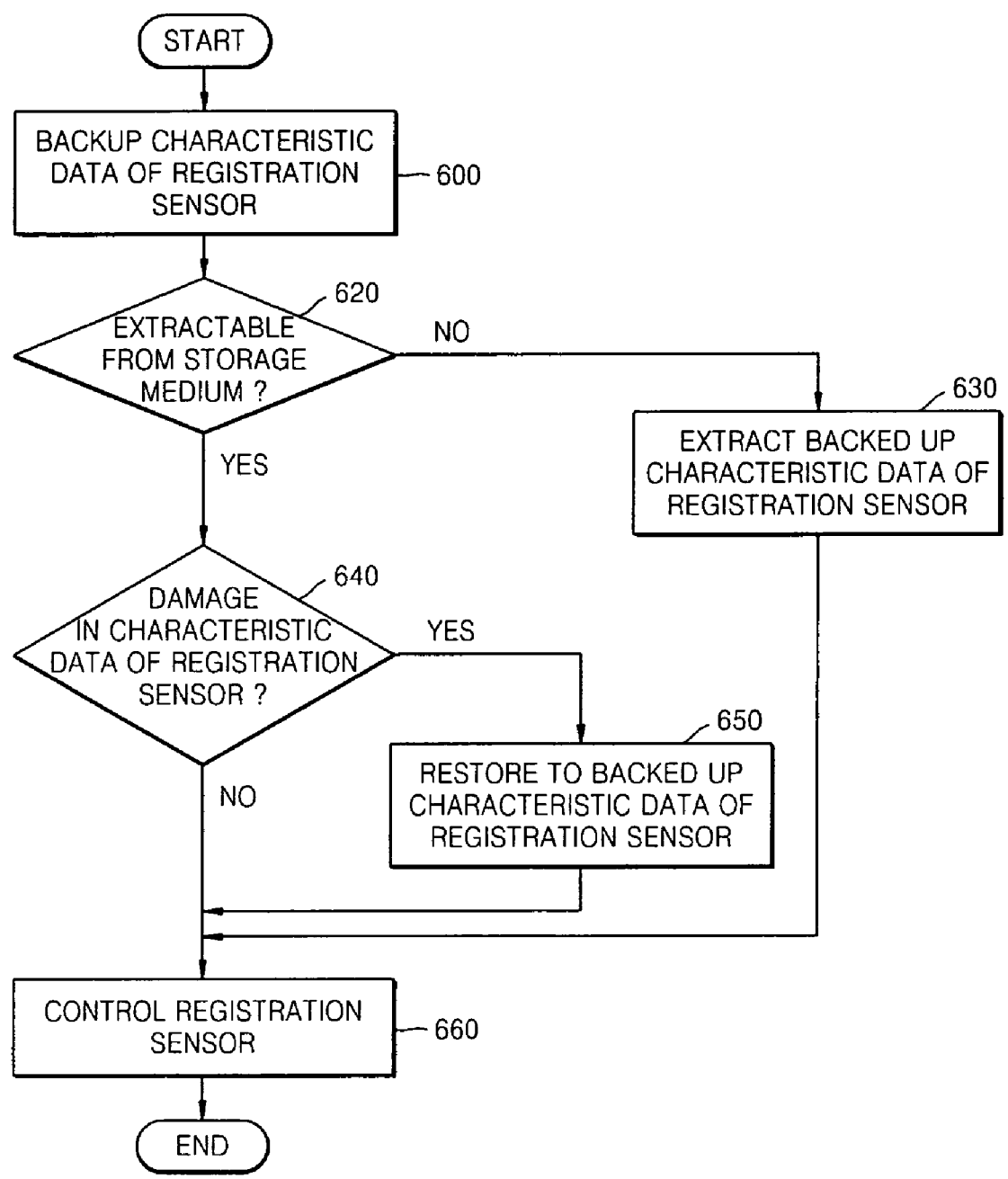
FIG. 6 is a flowchart of a method of controlling color registration sensors according to an exemplary embodiment of the present invention.

FIG. 6 is a flowchart of a method of controlling color registration sensors according to an exemplary embodiment of the present invention.

First, characteristics data of the registration sensors stored in the storage medium is backed up and stored (operation 600).

Next, a determination is made as to whether the characteristics data of the registration sensors can be extracted from the storage medium (operation 620).

Next, in operation 620, if a determination is made that the characteristics data of the registration sensors cannot be extracted, the characteristics data, which are backed up and stored according to operation 630, is extracted (operation 630).

Next, in operation 620, if a determination is made that the characteristics data of the registration sensors can be extracted, the state of damage to the characteristics data of the registration sensors stored in the storage medium is determined (operation 640).

Next, in operation 640, if a determination is made that the characteristics data of the registration sensors is damaged, the characteristics data of the registration sensors backed up and stored in operation 600 is extracted to restore the characteristics data of the registration sensors stored in the storage medium (operation 650).

Finally, in operation 640, a determination is made that the characteristics data of the registration sensors is not damaged after operation 630 or 650, the registration sensors are controlled based on the characteristics data of the registration sensors (operation 660).

Accordingly, in a method and apparatus for controlling color registration sensors according to exemplary embodiments of the present invention, registration of sensors is controlled based on characteristics data of the registration sensors by incorporating the registration sensors into a transfer unit and including a memory in which the characteristics data of the registration sensors is stored.

As a result, the time length of performing a color registration algorithm can be reduced. Although the transfer unit incorporated with the registration sensors is placed into other image forming apparatus, registration can also be achieved correctly in a short time irrespective of a set frame of the other image forming apparatus.

The exemplary embodiments of the present invention can be written as computer readable codes on a computer readable medium. The computer readable recording medium is any data storage device that can store data which can be thereafter read by a computer system. Examples of the computer readable recording medium include read-only memory (ROM), random-access memory (RAM), CD-ROMS, magnetic tapes, floppy disks, and optical data storage devices.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus comprising:
   a plurality of photosensitive drums;
   an exposing unit to irradiate light onto each of the photosensitive drums;
   a plurality of developing units, each respective developing unit to form a toner image by developing an electrostatic latent image formed on the respective photosensitive drum;
   a transfer member;
   at least one registration sensor including a light emitter to irradiate light in a direction toward the transfer member and a light receiver to receive reflected light and to output a signal corresponding to an amount of the reflected light; and
   a processor to determine image alignment error based on signals output by the light receiver of the at least one registration sensor;
   wherein the transfer member and the at least one registration sensor are incorporated within a single transfer unit such that when the transfer unit is replaced, the transfer member and the at least one registration sensor are simultaneously replaced.

2. The image forming apparatus of claim 1, wherein the transfer member comprises a transfer belt.

3. The image forming apparatus of claim 1, further comprising:
   a sensor data storage unit to store characteristics data of the at least one registration sensor; and a sensor control unit to control the at least one registration sensor according to the characteristics data of the at least one registration sensor stored in the sensor data storage unit.

4. An image forming apparatus comprising:

a transfer belt; and at least one registration sensor to irradiate light in a direction toward the transfer belt and to sense reflected light from the transfer belt, so as to obtain image alignment error;

wherein the transfer belt and the at least one registration sensor are incorporated within a single replaceable transfer unit such that when the replaceable transfer unit is replaced, the transfer belt and the at least one registration sensor are simultaneously replaced; and wherein the at least one registration sensor comprises a light emitting unit to irradiate light and a light receiving unit to receive the reflected light from the transfer belt and to output a signal corresponding to the received reflected light.

5. The image forming apparatus of claim 4, wherein the image alignment error is determined based on signals generated by the at least one registration sensor.

6. The image forming apparatus of claim 4, further comprising:

a sensor data storage unit to store characteristics data of the at least one registration sensor; and a sensor control unit to control the at least one registration sensor according the characteristics data of the at least one registration sensor stored in the sensor storage unit.

7. The image forming apparatus of claim 4, further comprising:

a plurality of photosensitive drums;

an exposing unit to irradiate light onto each of the photosensitive drums; and a plurality of developing units, each respective developing unit to form a toner image by developing an electrostatic latent images formed on the respective photosensitive drum.

* * * * *